May 4, 1926.
E. C. LARSEN
BAKING PAN
Filed April 29, 1925
1,583,295
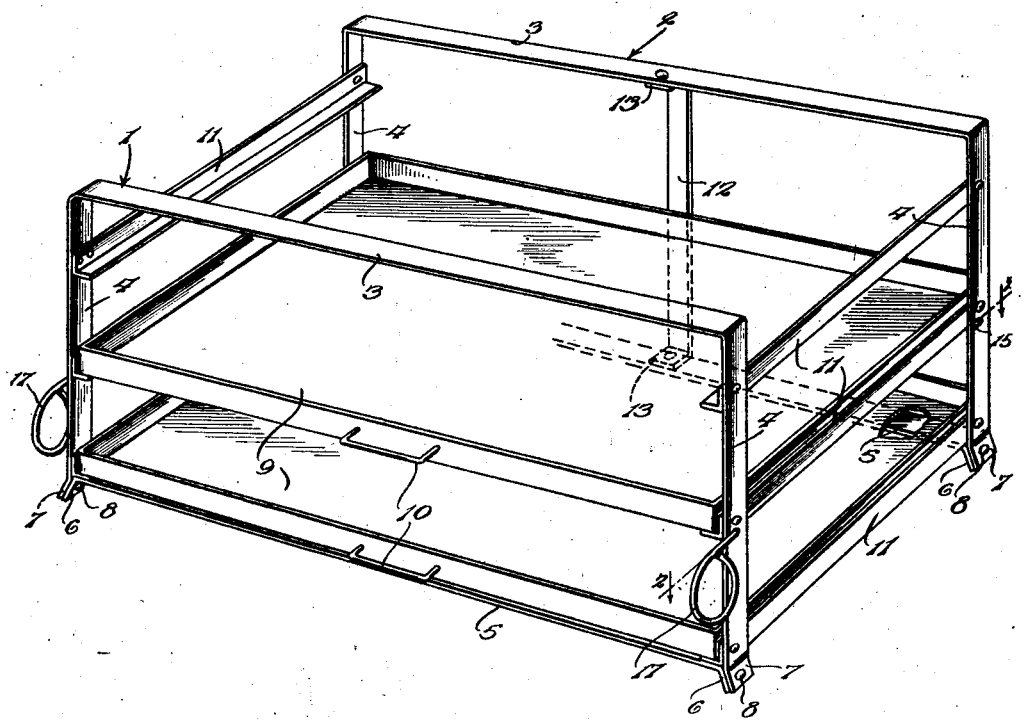
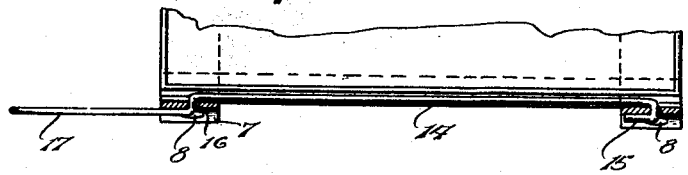
Inventor
Edna C. Larsen
By [signature], Attorneys Patented May 4, 1926.

1,583,295

UNITED STATES PATENT OFFICE.

EDNA C. LARSEN, OF WAUSAU, WISCONSIN.

BAKING PAN.

Application filed April 29, 1925. Serial No. 26,713.

*To all whom it may concern:*

Be it known that I, EDNA C. LARSEN, a citizen of the United States, residing at Wausau, in the county of Marathon and State of Wisconsin, have invented certain new and useful Improvements in Baking Pans, of which the following is a specification.

This invention relates to an improved baking pan and one object of the invention is to provide a baking pan by means of which a large number of articles, such as cookies, may be baked at one time. Under present conditions the cookies are placed in an ordinary baking pan and baked in the oven. This makes the baking of cookies very laborious as the pan will only hold a comparatively small number of cookies and it requires a great deal of time to bake the desired number of cookies. When, however, this improved device is made use of, the unbaked cookies may be placed in a number of pans and these pans all placed in the oven at one time, thereby permitting a large number of cookies to be baked at one time and thereby saving a great deal of time, fuel and trouble.

Another object of the invention is to provide a baking device of the character described which includes an improved type of frame to be placed in the oven and support the trays or pans in which the cookies will be placed while being baked. This frame is provided with feet which are of an improved construction and serve to support the body of the frame in an elevated position with respect to the bottom of the oven and is further provided with improved hand or finger-engaging means so that the frame may be readily placed in an oven or removed from the same.

This invention is illustrated in the accompanying drawing, wherein—

Figure 1 is a perspective view of the improved baking device with one of the trays or pans removed, and Fig. 2 is a fragmentary sectional view taken on the line 2—2 of Fig. 1 and showing the manner of forming and mounting one of the finger-engaging devices.

This improved baking device is provided with a frame which will be formed of a size for fitting into an oven of a conventional construction. At its forward and rear ends the frame has been provided with heads which are indicated in general by the numerals 1 and 2. Each of these heads has a main portion formed from a strip of metal bent to provide an upper strip or bridge bar 3 from the ends of which extend depending side arms 4. A lower strip 5 extends between the lower end portions of the side arms 4 and has its end portion 6 bent downwardly and outwardly for flat engagement with the inner surfaces of the outwardly bent lower end portions 7 of the side arms 4. These end portions 6 and 7 are secured together by rivets 8 and when so secured cooperate with each other to provide reinforced feet which flare outwardly and will serve to very firmly support the frame and permit air to circulate beneath the lower cookie-holding pan or tray.

These cooking pans which are rectangular in shape are preferably formed of metal bent to the desired shape and at their forward ends are provided with handles 10 so that they may be readily slid into and out of the frame. When in place, these trays rest upon tracks 11 formed of angle iron and extending between the forward and rear heads 1 and 2 with their end portions secured to the side arms 4 by rivets or other suitable fasteners. These fasteners pass through the vertically disposed flanges of the track strips 11 and mount the strips with their horizontally disposed flanges extending inwardly so that the trays may rest upon the horizontal flanges and between the vertical flanges when in place. It is desired to prevent the trays from being moved rearwardly beyond the position shown in Fig. 1 and, therefore, there has been provided an abutment strip 12 disposed vertically intermediate the width of the rear head 2, and having its upper and lower end portions bent to provide attaching feet 13 through which rivets or other fasteners will be passed to secure this abutment strip to the upper and lower strips 3 and 5 of the rear head.

This frame is to be placed in the oven when the device is in use and removed from the oven when not in use and it is, therefore, desirable to provide handle means which will permit of its being easily placed in the oven or removed from the oven. The handles which are made use of are located at opposite sides of the frame and each is formed from a strip of heavy wire. This wire 14 extends between the forward and rear heads and has its rear end portion passed outwardly through an opening formed in the side arm of the rear head and then bent forwardly to form a hook 15. This hook 15 will securely hold the rear end portion of the wire in engagement with the side arm of the rear head. The forward portion of the wire is bent and passed outwardly through an opening in the side arm of the forward head, as shown at 16, and then bent forwardly so that it extends beyond the forward head. After being bent to extend forwardly beyond the forward head, this extended forward end portion of the wire is bent downwardly and then rearwardly and upwardly to form a loop 17 in which a finger may be placed. It will thus be seen that the frame may be grasped by the handles with a finger of each hand extending through a loop 17 and the frame very easily lifted and placed in the oven or removed from the oven. From an inspection of Fig. 2, it will be noted that since portions of the wire 14 are bent and passed through an opening formed in the side arms of the forward and rear head, the wires will assist in bracing the frame and maintaining the heads in a vertical position.

When this device is in use, the frame will be grasped by the handles and placed in the oven. The trays will be removed from the frame and the cookies to be baked will be placed in the trays or pans. After the cookies have been placed in the pans, the oven door will be opened and the trays slid into the frame upon the track 11. The cookies will then be allowed to bake in the usual manner and when properly baked the trays will be removed. It will thus be seen that a great many cookies can be baked at one time. While three trays have been shown in use, it will be obvious that this number could be varied by simply providing the proper number of trays and tracks. After the baking has been completed, the frame will be removed from the oven and put away together with the trays until again needed. There has, therefore, been provided a baking device which will be very convenient in use and cause a great saving of fuel, time and labor.

Having thus described the invention, I claim:

1. In a baking device, a frame having vertically disposed forward and rear head portions, each of said head portions being substantially rectangular and having side strips and upper and lower strips, the lower strips having their end portions extending downwardly and outwardly and the lower end portions of the side strips being extended outwardly and secured against the depending end portion of the lower strips and cooperating therewith to provide flared reinforced feet, track strips extending between the forward and rear head portions and secured to said side strips in vertical spaced relation to each other, and trays resting upon said track strips and slidable thereon into and out of the frame through the forward head.

2. In a baking device, a frame having vertically disposed forward and rear head portions, each of said head portions being substantially rectangular and having side strips and upper and lower strips, the lower strips having their end portions extending downwardly and outwardly and the lower end portions of the side strips being extended outwardly and secured against the depending end portions of the lower strips and cooperating therewith to provide flared reinforced feet, track strips extending between the forward and rear head portions and secured to said side strips in vertical spaced relation to each other, trays resting upon said track strips and slidable thereon into and out of the frame through the forward head, and a vertical abutment strip disposed intermediate the width of the rear head and secured to the upper and lower strips thereof, said abutment strip serving to limit rearward movement of the trays.

3. In a baking device, a frame having vertically disposed forward and rear head portions, each of said head portions being substantially rectangular and having side strips and upper and lower strips, track strips extending between said heads and secured to the side strips thereof, rods extending between said heads at the sides thereof and having hooks at their rear ends passed through openings in the side strips of the rear head and their forward end portions passed through openings in the side strips of the forward head and extended forwardly beyond the forward head and formed into hand-engaging elements.

4. In a baking device, a frame having vertically disposed forward and rear head portions, each of said head portions being substantially rectangular and having side strips and upper and lower strips, track strips extending between said heads and secured to the side strips thereof, rods extending between said heads at the sides thereof and having their rear ends passed outwardly through openings in the side strips of rear head and bent forwardly to provide anchoring hooks, the forward end portions of said rods being passed outwardly through openings in the side strips of the forward head and extended forwardly beyond the forward head and bent to form finger-receiving loops.

In testimony whereof I affix my signature.

EDNA C. LARSEN. [L. S.]